United States Patent [19]

Koelle et al.

[11] Patent Number: 4,560,202

[45] Date of Patent: Dec. 24, 1985

[54] HEADREST OF A MOTOR VEHICLE SEAT

[75] Inventors: Erwin Koelle, Sindelfingen; Josef Klink, Nagold, both of Fed. Rep. of Germany

[73] Assignee: Daimler-Benz Aktiengesellschaft, Stuttgart, Fed. Rep. of Germany

[21] Appl. No.: 559,261

[22] Filed: Dec. 8, 1983

[30] Foreign Application Priority Data

Dec. 17, 1982 [DE] Fed. Rep. of Germany ....... 3246778

[51] Int. Cl.$^4$ ................................................ A47C 1/10
[52] U.S. Cl. ..................................... 297/410; 297/391
[58] Field of Search ................................ 297/410, 391

[56] References Cited

U.S. PATENT DOCUMENTS 2,985,229  5/1961  Shamblin ............................ 297/410
4,350,389  9/1982  Parsson et al. ...................... 297/410

FOREIGN PATENT DOCUMENTS 2925781  1/1981  Fed. Rep. of Germany .
2057255  4/1981  United Kingdom ............... 297/410

Primary Examiner—James T. McCall
Attorney, Agent, or Firm—Barnes & Thornburg

[57] ABSTRACT

A headrest is provided which is vertically displaceable by means of remote control and which is supported in rails and sliding members for receiving individual headrest support rods, at least one support rod is engaged releasably at its free end by a coupling which includes a spring engagement means and which projects from the top end of a rack extending in the supporting rail. This rack meshes with a gearwheel which is accommodated in a housing connected to the rail and guiding the rack.

17 Claims, 2 Drawing Figures

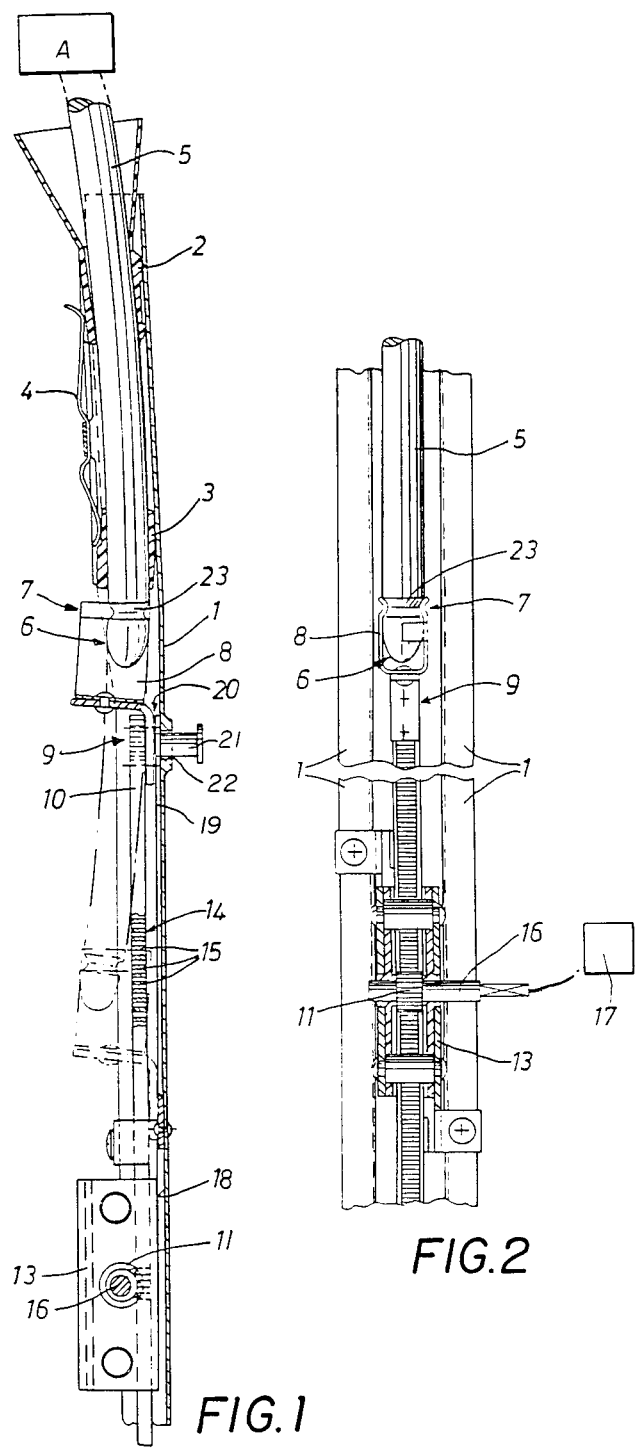

4,560,202

HEADREST OF A MOTOR VEHICLE SEAT

BACKGROUND AND SUMMARY OF THE INVENTION

The present invention relates generally to headrests for motor vehicle seats and, more particularly, to such headrests which are vertically displaceable by means of remote control devices.

A vertical-displacement device of this type for a headrest is shown and described in German Published Unexamined Application (Offenlegungsschrift) No. 2,925,781. In this document, the adjusting movement introduced via the remote control device is transmitted to a gearwheel and from this to a rack. The headrest has two support rods which are guided by means of sliding members and which are connected to the backrest frame via rails of U-shaped profile extending in the direction of the support rods. However, both the rails and the support rods are respectively connected to one another by bridge means. These bridge means serve to receive gearwheel and rack means. This arrangement results not only in a stiffening of the seat, which has an adverse influence on the springing properties when the strength of the rest is maintained, but also in a reduction in the upholstery thickness at least in the region between the rails. Moreover, the installation and especially the removal of a headrest of this type are extremely difficult, and it is not possible simply to pull out the headrests of unoccupied seats to increase visibility. Further, motor vehicle seats are often equipped only at special request with such headrests which are vertically displaceable via remote control, so that different headrest designs are necessary when non-remote control adjustment principles are used.

It is therefore an object of the present invention to provide a headrest means vertically displaceable by means of remote control devices which can be installed and removed easily.

Another object of the present invention is the provision of headrest means in which the gear components necessary for executing the lifting movement are arranged so that stiffening of the seat and a substantial reduction in the upholstery thickness are avoided.

Yet another object of the present invention is to provide a headrest means which will be of identical design for seats with and without remotely actuable vertical displacement.

These and other objects of the present invention are achieved in the provision of a headrest of the type mentioned herein above which is vertically displaceable by remote control, wherein at least one support rod is received releasably at its free end by a coupling which projects from the top end of a rack means extending along the supporting rail, and wherein housing means which receives the gearwheel and guides the rack means is also supported on the rail.

The amount of housing which projects beyond the rail can be reduced even further while maintaining good headrest displacement force transmission if the rack has the form of a ladder, the rungs of which act as the teeth of the rack when engaging the gearwheel.

According to especially preferred embodiments of the invention, the support rod can be coupled and uncoupled in a simple way by providing that the rack is formed from resilient material and the coupling is designed as a spring engagement means which, when the headrest is fully extended, can be pressed sideways by the free end of a leaf spring fastened to the bottom of the rail until the engagement with the support rod is cancelled.

In a further embodiment of the present invention, the free end of the leaf spring is provided with an actuating pin which passes through an orifice in the rail in the direction of the rear wall of the backrest. This pin can readily be felt through the upholstery covering and pressed in.

Further objects, features, and advantages of the present invention will become more apparent from the following description when taken with the accompanying drawings which show, for purposes of illustration only, a preferred embodiment in accordance with the present invention.

BRIEF DESCRIPTION OF THE DRAWINGS

FIG. 1 shows a partial cross-sectional side view of a vertically displaceable headrest assembly constructed according to a preferred embodiment of the present invention.

FIG. 2 shows a partial plan view of the coupling connecting the support rod and the rack and a cross-sectional cutaway view of the housing accomodating the gearwheel of the headrest assembly shown in FIG. 1.

DETAILED DESCRIPTION OF THE DRAWING

FIG. 1, which illustrates a preferred embodiment of the present invention, shows a headrest assembly means having sliding members 2 and 3, secured against displacement by spring means 4, which are received between two rails 1 of U-shaped profile. These rails 1 are located at a spaced apart distance from one another and are connected to the backrest frame of a seat (not shown) by any convenient or conventional means. Only one of these rails 1 is illustrated in FIG. 1 for the sake of simplicity.

Support rod 5, one of a plurality of such support rods typically employed to support a headrest A, is mounted so as to be vertically displaceable in sliding members 2 and 3. Free end 6 of support rod 5 is illustrated as engaging, as shown especially in FIG. 2, coupling 7. This coupling 7 includes spring engagement means 8 and which is fastened to the top end 9 of a flexible rack 10 by, in a preferred embodiment of the present invention, rivet means. The present invention does, however, contemplate the use of various other means of securement.

Rack 10 meshes with a gearwheel 11 which is received by a housing 13 connected to rail 1. Housing 13 is provided with means for the guidance of rack 10 and projects only slightly beyond rail 1. The amount of projection is only slight because rack 10 has the form of a ladder 14, the rungs 15 of which representing the rack teeth, so that the gearwheel 11 experiences deep engagement which assists in the transmission of high headrest displacement forces. Gearwheel 11 is fixed in a non-rotational manner onto a shaft 16 which engages a remote control device 17, as indicated in FIG. 2. This remote control device can be made to execute alternating rotary movements via, for example, a handwheel or a servo-motor (not shown).

As seen in FIG. 1, a leaf spring 19 is fastened to the bottom 18 of the rail 1 which has at its free end 20 an actuating pin 21 which projects through an orifice 22 in rail 1 in the direction of the rear side of the seat backrest. When support rod 5 is transferred from its lower position, as indicated by dot-and-dash lines, to its upper position, as represented by unbroken lines, actuating pin 21, which can easily be felt through the rear upholstery covering of the seat (not shown), may be pressed inwardly such that spring engagement means 8, and together with it rack 10, are pressed away from rail 1 and support rod 5 until spring engagement means 8 is disengaged from support rod 5. Conversely, when the support rod 5 is pressed downwardly into coupling 7, spring engagement means 8 is first widened resiliently and then engages with prestress force into an associated receptacle 23 of the support rod 5.

Although the present invention has been described and illustrated above in detail, it is to be clearly understood that the same is by way of illustration and example only, and is not to be taken by way of limitation. The spirit and scope of the present invention are to be limited only by the terms of the appended claims.

What is claimed is:

1. A headrest means for a motor vehicle seat which is vertically displaceable by remote control means for adjusting movement comprising:
   rack means;
   gearwheel means for transmitting said adjusting movement to said rack means;
   at least one support rod;
   sliding means for guiding movement of said support rod;
   rail means extending in the direction of said support rod for slidably connecting said support rod to a backrest frame of said seat;
   coupling means projecting from the top end of said rack means for releasably engaging said support rod at the free end of said rod; and
   housing means for receiving said gearwheel means and guiding said rack means supported on said rail means.

2. A vertically displaceable headrest means as claimed in claim 1 wherein said rack means has the form of a ladder, the rungs of which represent the rack teeth.

3. A vertically displaceable headrest means as claimed in claim 1, wherein said rack means is formed from resilient material, leaf spring means is fastened to the bottom of said rail means, and said coupling means includes spring engagement means which, when said headrest means is fully extended, can be pressed sideways by the free end of said leaf spring means until the engagement with said support rod is cancelled.

4. A vertically displaceable headrest means as claimed in claim 2, wherein said rack means is formed from resilient material, leaf spring means is fastened to the bottom of said rail means, and said coupling means includes spring engagement means which, when said headrest means is fully extended, can be pressed sideways by the free end of said leaf spring means until the engagement with said support rod is cancelled.

5. A vertically displaceable headrest means as claimed in claim 3 wherein the free end of said leaf spring means is provided with an actuating pin which passes through an orifice in said rail means in the direction of the rear side of the backrest.

6. A vertically displaceable headrest means as claimed in claim 4 wherein the free end of said leaf spring means is provided with an actuating pin which passes through an orifice in said rail means in the direction of the rear side of the backrest.

7. A headrest means for a motor vehicle seat which is vertically displaceable by remote control means for adjusting movement comprising:
   rack means;
   gearwheel means for transmitting said remote control adjusting movement to said rack means;
   at least one support rod guided by sliding members and connected thereby to the backrest frame of said seat;
   housing means for receiving said gearwheel and guiding said rack being supported on rail means which is fixed to said backrest and in which said rack extends; and
   coupling means which projects from the top end of said rack wherein said support rod is engaged releasably at its free end.

8. The vertically displaceable headrest means as claimed in claim 7 wherein said rack is formed from resilient material, further including leaf spring means fastened to the bottom of said rail means, and wherein said coupling means includes spring engagement means which, when said headrest is fully extended, can be pressed sideways by the free end of said leaf spring means until engagement with said support rod is cancelled.

9. The vertically displaceable headrest means as claimed in claim 8 wherein said free end of said leaf spring means is provided with an actuating pin which passes through an orifice in the bottom of said rail in the direction of the rear side of said backrest.

10. A headrest means for use with a motor vehicle seat which is adjustable by remote control means comprising:
    rail means connected to said vehicle seat;
    sliding members fixed to said rail means;
    at least one headrest support rod movably mounted in said sliding members;
    rack means having a top portion and a bottom portion;
    gearwheel means for engaging said rack means to transmit remote control adjusting movement thereto;
    housing means for supporting said gearwheel means and guiding said rack means, supported on said rail means; and releasably engageable coupling means for joining said support rod to said top portion of said rack means.

11. A headrest means for a motor vehicle seat which is vertically displaceable by remote control for adjusting movement comprising:
    rack means, said rack means having the form of a ladder, the rungs of which represent the rack teeth;
    gearwheel means for transmitting said adjusting movement to said rack means;
    two support rods;
    sliding means for guiding movement of said support rods;
    rail means of U-shaped profile extending in the direction of said support rods and connecting said support rods to the backrest frame of said seat;
    coupling means for releasably engaging one of said support rods at the free end of said rod which projects from the top end of said rack means; and
    housing means for receiving said gearwheel means and guiding said rack means supported on said rail means.

12. A headrest means for a motor vehicle seat which is vertically displaceable by remote control for adjusting movement comprising:
- rack means;
- gearwheel means for transmitting said adjusting movement to said rack means;
- two support rods;
- sliding means for guiding movement of said support rods;
- rail means of U-shaped profile extending in the direction of said support rods and connecting said support rods to the backrest frame of said seat;
- coupling means for releasably engaging one of said support rods at the free end of said rod which projects from the top end of said rack means;
- housing means for receiving said gearwheel means and guiding said rack means supported on said rail means;
- said rack means being formed from resilient material, leaf spring means being fastened to the bottom of said rail means, and said coupling means including spring engagement means which, when said headrest means is fully extended, can be pressed sideways by the free end of said leaf spring means until the engagement with said support rod is cancelled.

13. A vertically displaceable headrest means according to claim 11, wherein said rack means is formed resilient material, leaf spring means is fastened to the bottom of said rail means, and said coupling means includes spring engagement means, said spring engagement means capable of being disengaged from said support rod when said headrest means is fully extended and said spring engagement means is pressed sideways by a free end of said leaf spring means.

14. A vertically displaceable headrest means according to claim 12, wherein the free end of said leaf spring means is provided with an actuating pin, said actuating pin passing through an orifice in said rail means in the direction of a rear side of the backrest.

15. A vertically displaceable headrest means according to claim 13, wherein the free end of said leaf spring means is provided with an actuating pin, said actuating pin passing through an orifice in said rail means in the direction of a rear side of the backrest.

16. A headrest means for a motor vehicle seat which is vertically displaceable by remote control means for adjusting movement comprising:
- rack means formed from resilient material;
- gearwheel means for transmitting said remote control adjusting movement to said rack means;
- two support rods guided by sliding members and connected thereby to the backrest frame of said seat;
- housing means for receiving said gearwheel and guiding said rack being supported on rail means which is fixed to said backrest and in which said rack extends; and
- coupling means which projects from the top end of said rack wherein one of said support rods is engaged releasably at its free end;
- further including leaf spring means fastened to the bottom of said rail means, and wherein said coupling means includes spring engagement means which, when said headrest is fully extended, can be pressed sideways by the free end of said leaf spring means until engagement with said support rod is cancelled.

17. A vertically displaceable headrest according to claim 16, wherein said free end of said leaf spring means is provided with an actuating pin, said actuating pin passing through an orifice in the bottom of said rail in the direction of a rear side of said backrest.

* * * * *